United States Patent
Farago

(10) Patent No.: US 10,042,519 B2
(45) Date of Patent: *Aug. 7, 2018

(54) CREATION AND EXPOSURE OF EMBEDDED SECONDARY CONTENT DATA RELEVANT TO A PRIMARY CONTENT PAGE OF AN ELECTRONIC BOOK

(71) Applicant: barnesandnoble.com llc, New York, NY (US)

(72) Inventor: Peter Farago, New York, NY (US)

(73) Assignee: Nook Digital, LLC, New York, NY (US)

(*) Notice: Subject to any disclaimer, the term of this patent is extended or adjusted under 35 U.S.C. 154(b) by 674 days.

This patent is subject to a terminal disclaimer.

(21) Appl. No.: 14/532,628

(22) Filed: Nov. 4, 2014

(65) Prior Publication Data
US 2015/0052472 A1 Feb. 19, 2015

Related U.S. Application Data

(63) Continuation of application No. 13/615,710, filed on Sep. 14, 2012, now Pat. No. 8,904,304.
(Continued)

(51) Int. Cl.
*G06F 3/0483* (2013.01)
*G06F 3/0488* (2013.01)

(52) U.S. Cl.
CPC .......... *G06F 3/0483* (2013.01); *G06F 3/0488* (2013.01); *G06F 3/04883* (2013.01)

(58) Field of Classification Search
CPC ... G06F 3/0488; G06F 3/0483; G06F 3/04883
See application file for complete search history.

(56) References Cited

U.S. PATENT DOCUMENTS 5,347,295 A * 9/1994 Agulnick .............. G06F 1/1626
345/156
5,600,765 A * 2/1997 Ando ..................... G06F 3/038
345/668
(Continued)

FOREIGN PATENT DOCUMENTS

EP 1359522 A1 11/2003
EP 1752894 A2 2/2007
(Continued)

OTHER PUBLICATIONS

International Preliminary Report on Patentability and Written Opinion received for PCT Patent Application No. PCT/US2013/047324, dated Jan. 8, 2015. 8 Pages.
(Continued)

*Primary Examiner* — David Choi
(74) *Attorney, Agent, or Firm* — Finch & Maloney PLLC

(57) ABSTRACT

Disclosed are several methods, apparatus, and a system to create, expose, and hide embedded secondary content data relevant to a primary content page of an electronic book generated by a content generating device. The method, system, and apparatus is enabled through a Y-axis slide apart gesture that is applied to a notification region of the primary content page such that the secondary content data is made visible when the Y-axis slide apart gesture is applied to the notification region. The method, system, and apparatus is also enabled through a Y-axis pinch close gesture that is applied to a boundary of an exposed pane that is appearing in the primary content page such that the Y-axis pinch close gesture collapses the exposed pane in which the secondary content data is made visible. In one embodiment, the system comprises an association server, an electronic book distribution server, and a content rendering device.

21 Claims, 9 Drawing Sheets

Related U.S. Application Data

(60) Provisional application No. 61/664,136, filed on Jun. 25, 2012.

(56) References Cited

U.S. PATENT DOCUMENTS

| | | | | |
|---|---|---|---|---|
| 5,717,939 | A * | 2/1998 | Bricklin | G06F 17/211 345/173 |
| 5,732,227 | A * | 3/1998 | Kuzunuki | G06F 3/017 715/775 |
| 5,737,507 | A * | 4/1998 | Smith | G06F 3/0481 345/666 |
| 5,917,490 | A * | 6/1999 | Kuzunuki | G06F 3/017 715/775 |
| 5,966,129 | A * | 10/1999 | Matsukuma | G06T 13/20 345/418 |
| 6,018,346 | A * | 1/2000 | Moran | G06Q 10/109 705/12 |
| 6,331,867 | B1 | 12/2001 | Eberhard et al. | |
| 6,384,829 | B1 * | 5/2002 | Prevost | G06K 9/00335 345/473 |
| 6,943,774 | B2 * | 9/2005 | Horiki | G06F 1/1616 178/18.09 |
| 6,985,913 | B2 | 1/2006 | Murata | |
| 7,173,637 | B1 * | 2/2007 | Hinckley | G06F 3/0362 345/684 |
| 7,231,609 | B2 * | 6/2007 | Baudisch | G06F 3/0486 715/769 |
| 7,496,829 | B2 | 2/2009 | Rubin et al. | |
| 7,659,891 | B2 * | 2/2010 | Mackenzie | G06F 17/30011 345/156 |
| 7,770,116 | B2 * | 8/2010 | Zhang | G06F 17/30843 345/619 |
| 7,770,120 | B2 * | 8/2010 | Baudisch | G06F 3/0486 715/740 |
| 7,809,956 | B2 | 10/2010 | Ebihara et al. | |
| 7,821,507 | B2 * | 10/2010 | Lapstun | G06F 3/03545 235/375 |
| 7,861,166 | B1 | 12/2010 | Hendricks | |
| 7,864,163 | B2 * | 1/2011 | Ording | G06F 3/0488 345/173 |
| 7,882,140 | B1 | 2/2011 | DeLorenzo | |
| 7,886,229 | B2 * | 2/2011 | Pachet | G06F 3/017 715/726 |
| 7,895,337 | B2 | 2/2011 | Rossi et al. | |
| 7,920,102 | B2 * | 4/2011 | Breed | B60K 35/00 340/991 |
| 7,956,848 | B2 * | 6/2011 | Chaudhri | G06F 3/04883 345/173 |
| 7,966,578 | B2 * | 6/2011 | Tolmasky | G06F 1/1626 715/773 |
| 7,979,809 | B2 * | 7/2011 | Sunday | G06F 3/0483 345/156 |
| 7,987,271 | B1 | 7/2011 | O'Toole | |
| 8,095,546 | B1 | 1/2012 | Baluja | |
| 8,103,743 | B2 | 1/2012 | Tokumi | |
| 8,127,227 | B1 | 2/2012 | Kates et al. | |
| 8,176,435 | B1 * | 5/2012 | Jitkoff | G06F 3/04883 715/701 |
| 8,358,281 | B2 * | 1/2013 | McCullough | G06F 3/0481 345/173 |
| 8,411,061 | B2 * | 4/2013 | Bolsinga | G06F 3/04883 345/173 |
| 8,542,205 | B1 * | 9/2013 | Keller | G06F 3/0488 345/173 |
| 8,904,304 | B2 * | 12/2014 | Farago | G06F 3/04883 235/375 |
| 2001/0007980 | A1 | 7/2001 | Atsushi et al. | |
| 2003/0144961 | A1 | 7/2003 | Tharaken et al. | |
| 2004/0003344 | A1 | 1/2004 | Lai et al. | |
| 2004/0268253 | A1 | 12/2004 | Demello et al. | |
| 2005/0149880 | A1 | 7/2005 | Postrel | |
| 2006/0242574 | A1 * | 10/2006 | Richardson | G06F 17/30899 715/210 |
| 2007/0050808 | A1 | 3/2007 | Matsuyama et al. | |
| 2007/0101262 | A1 | 5/2007 | Suzuki et al. | |
| 2007/0118795 | A1 * | 5/2007 | Noyes | G06F 17/241 715/203 |
| 2007/0162456 | A1 | 7/2007 | Agassi et al. | |
| 2008/0040692 | A1 * | 2/2008 | Sunday | G06F 3/04883 715/863 |
| 2008/0082922 | A1 | 4/2008 | Biniak et al. | |
| 2008/0227553 | A1 | 9/2008 | Leifenberg et al. | |
| 2008/0268416 | A1 | 10/2008 | Wallace et al. | |
| 2009/0091578 | A1 | 4/2009 | Carnahan et al. | |
| 2009/0171751 | A1 | 7/2009 | Zhou et al. | |
| 2009/0227232 | A1 * | 9/2009 | Matas | H04M 1/665 455/411 |
| 2009/0241054 | A1 | 9/2009 | Hendricks | |
| 2009/0258677 | A1 * | 10/2009 | Ellis | G06F 3/04883 455/556.1 |
| 2009/0305785 | A1 * | 12/2009 | Beeman | A63F 13/06 463/36 |
| 2009/0313536 | A1 | 12/2009 | Karidi et al. | |
| 2009/0327974 | A1 * | 12/2009 | Abanami | G06F 3/03547 715/863 |
| 2010/0153836 | A1 | 6/2010 | Krassner et al. | |
| 2010/0235473 | A1 * | 9/2010 | Koren | G06F 17/30902 709/219 |
| 2010/0262659 | A1 * | 10/2010 | Christiansen | G06F 17/241 709/205 |
| 2011/0050594 | A1 | 3/2011 | Kim et al. | |
| 2011/0141031 | A1 * | 6/2011 | McCullough | G06F 3/0481 345/173 |
| 2011/0145724 | A1 * | 6/2011 | Tsai | G06F 1/1647 715/748 |
| 2011/0157098 | A1 | 6/2011 | Liu | |
| 2011/0184827 | A1 * | 7/2011 | Hubert | G06F 17/30011 705/26.1 |
| 2011/0246888 | A1 | 10/2011 | Drucker et al. | |
| 2011/0252306 | A1 * | 10/2011 | Williamson | G06F 3/04883 715/234 |
| 2011/0252307 | A1 * | 10/2011 | Williamson | G06F 3/04883 715/234 |
| 2011/0261030 | A1 * | 10/2011 | Bullock | G06F 15/0283 345/204 |
| 2011/0264530 | A1 | 10/2011 | Santangelo et al. | |
| 2011/0320529 | A1 | 12/2011 | Mentchoukov et al. | |
| 2012/0011001 | A1 | 1/2012 | Gross et al. | |
| 2012/0036431 | A1 | 2/2012 | Ito et al. | |
| 2012/0038582 | A1 * | 2/2012 | Grant | G06F 3/016 345/174 |
| 2012/0054822 | A1 | 3/2012 | Dvorak et al. | |
| 2012/0096094 | A1 | 4/2012 | So et al. | |
| 2012/0110002 | A1 * | 5/2012 | Giambalvo | G06F 17/30994 707/769 |
| 2012/0131150 | A1 | 5/2012 | Jeong | |
| 2012/0143590 | A1 | 6/2012 | Ajima | |
| 2012/0155711 | A1 * | 6/2012 | Ryoo | G06K 9/00805 382/104 |
| 2012/0162093 | A1 * | 6/2012 | Buxton | G06F 3/0482 345/173 |
| 2012/0173659 | A1 | 7/2012 | Thaxter et al. | |
| 2012/0173960 | A1 * | 7/2012 | Bennett | G06F 17/217 715/234 |
| 2012/0200573 | A1 * | 8/2012 | Stoner | G09B 5/02 345/472 |
| 2012/0206388 | A1 * | 8/2012 | Tsuboi | G06F 3/0482 345/173 |
| 2012/0218305 | A1 * | 8/2012 | Patterson | G06F 17/2235 345/652 |
| 2012/0221929 | A1 * | 8/2012 | Bolsinga | G06F 3/04883 715/205 |
| 2012/0221936 | A1 * | 8/2012 | Patterson | G06F 17/241 715/230 |
| 2012/0221938 | A1 * | 8/2012 | Patterson | G06F 17/2235 715/232 |
| 2012/0229491 | A1 | 9/2012 | Hymel | |
| 2012/0233539 | A1 | 9/2012 | Reed | |
| 2012/0278712 | A1 * | 11/2012 | Wright | G06F 3/04883 715/702 |

(56) References Cited

U.S. PATENT DOCUMENTS

| | | | | |
|---|---|---|---|---|
| 2012/0284753 | A1* | 11/2012 | Roberts | H04N 21/41407 725/45 |
| 2012/0297294 | A1* | 11/2012 | Scott | G06F 17/273 715/261 |
| 2012/0319989 | A1* | 12/2012 | Argiro | G06F 3/038 345/174 |
| 2013/0036383 | A1* | 2/2013 | Yuan | G06F 3/0482 715/815 |
| 2013/0047079 | A1* | 2/2013 | Kroeger | G06F 17/212 715/273 |
| 2013/0054636 | A1* | 2/2013 | Tang | G06F 17/30722 707/769 |
| 2013/0063362 | A1* | 3/2013 | Papakipos | G06F 1/1626 345/173 |
| 2013/0067400 | A1* | 3/2013 | Jitkoff | G06F 3/04883 715/800 |
| 2013/0073932 | A1* | 3/2013 | Migos | G06F 15/0291 715/201 |
| 2013/0124988 | A1* | 5/2013 | Lettau | G06F 17/211 715/277 |
| 2013/0346906 | A1* | 12/2013 | Farago | G06F 3/04883 715/776 |
| 2015/0052472 | A1* | 2/2015 | Farago | G06F 3/04883 715/776 |

FOREIGN PATENT DOCUMENTS

| | | |
|---|---|---|
| EP | 2194500 A1 | 6/2010 |
| EP | 2234400 A1 | 9/2010 |
| EP | 2468370 A1 | 6/2011 |
| EP | 2472494 A1 | 7/2012 |
| WO | 2000065482 A1 | 11/2000 |
| WO | 2001069470 A1 | 9/2001 |
| WO | 2002069129 A1 | 9/2002 |
| WO | 2004008351 A1 | 1/2004 |
| WO | 2005001708 A1 | 1/2005 |
| WO | 2005032031 A2 | 4/2005 |
| WO | 2006034124 A2 | 3/2006 |
| WO | 2008126050 A2 | 10/2008 |
| WO | 2009102666 A1 | 8/2009 |
| WO | 2010094907 A1 | 8/2010 |
| WO | 2011094855 A1 | 8/2011 |
| WO | 201119445 A2 | 9/2011 |
| WO | 2011109606 A1 | 9/2011 |
| WO | 2011129122 A1 | 10/2011 |
| WO | 2011143168 A1 | 11/2011 |
| WO | 2012090431 A1 | 7/2012 |
| WO | 2012092247 A1 | 7/2012 |

OTHER PUBLICATIONS

International Search Report and Written Opinion received for PCT Patent Application No. PCT/US2013/047324, dated Sep. 30, 2013. 9 Pages.
Non-Final Office Action issued for U.S. Appl. No. 13/615,710, dated Apr. 11, 2013. 54 pages.
Final Office Action issued for U.S. Appl. No. 13/615,710, dated Jun. 25, 2013. 48 pages.
Non-Final Office Action issued for U.S. Appl. No. 13/615,710, dated Jan. 13, 2014. 53 pages.
Final Office Action issued for U.S. Appl. No. 13/615,710, dated May 15, 2014. 50 pages.
U.S. Appl. No. 13/615,710, filed Sep. 14, 2012.
U.S. Appl. No. 61/664,136, filed Jun. 25, 2012.

* cited by examiner

| PAGE LOCATION 808 | PRIMARY CONTENT PAGE 112 | SECONDARY CONTENT DATA 114 | COMPILED CONTENT 710 | NOTIFICATION TYPE 802 | NOTIFICATION LOCATION 804 | SECONDARY FETCH LOCATION 806 |
|---|---|---|---|---|---|---|
| 1 | a (112a) | A (114A) | Aa (710Aa) | STANDARD 802A | 3/4 PAGE | CLIENT 806A |
| 15 | b (112b) | B (114B) | Bb (710Bb) | CUSTOM 802B | 2/3 PAGE | SERVER 806B |
| 24 | c (112c) | C (114C) | Cc (710Cc) | IMAGE 802C | 7/8 PAGE | CLIENT SERVER 806C |
| • | • | • | • | • | • | • |
| • | • | • | • | • | • | • |
| • | • | • | • | • | • | • |
| • | • | • | • | • | • | • |
| ⋅ | ⋅ | ⋅ | ⋅ | ⋅ | ⋅ | ⋅ |

FIGURE 8

CREATION AND EXPOSURE OF EMBEDDED SECONDARY CONTENT DATA RELEVANT TO A PRIMARY CONTENT PAGE OF AN ELECTRONIC BOOK

RELATED APPLICATION

This application is a continuation of U.S. application Ser. No. 13/615,710, filed Sep. 14, 2012, which claims the benefit of U.S. Provisional Patent Application No. 61/664,136 titled "Creation and Exposure of Embedded Secondary Content Relevant to a Primary Content Page of an Electronic Book Through a Y-Axis Gesture at a Notification Region in the Primary Content Page," filed on Jun. 25, 2012. Each of these applications is herein incorporated by reference in its entirety.

FIELD OF TECHNOLOGY

This disclosure relates generally to an electronic book technology, in one example embodiment, to a system, method and/or apparatus to create and expose an embedded secondary content data relevant to a primary content page of an electronic book through a Y-axis gesture at a notification region in the primary content page.

BACKGROUND

Humans have a curiosity to look behind things. For example, a person may look behind doors, peek out of windows, and open up presents. The sense of anticipation followed by surprise associated with such an act creates feelings of enjoyment and satisfaction at finding what was initially hidden from plain view. This curiosity does not diminish when one is reading a book or magazine. In both cases, the reader will often be curious to learn the meaning of a word or the history behind a subject presented in the text of the book or magazine. For example, a child reading the Harry Potter® book series may want to know the origin of the word "wizard" or brush up on the history of medieval Europe.

One way that a reader can satisfy this curiosity is by having, on hand, reference texts such as encyclopedias, dictionaries, or textbooks related to the various subjects the reader finds interesting. However, such reference texts are often expensive and cumbersome to transport and bringing such texts along whenever one is in the mood for a good story diminishes the reading experience. While electronic books (or e-books) have enabled readers to store multiple texts in one place, the reader is still required to predict which electronic reference texts are necessary to satisfy the reader's sense of curiosity going forward and to have such electronic reference texts loaded on the e-book before starting a new book or story. Unfortunately, the reader cannot always predict which reference texts will be necessary and whether such texts will satisfy his or her sense of curiosity before starting a good book.

SUMMARY

Disclosed are several methods, apparatus, and a system to create, expose, and hide embedded secondary content data relevant to a primary content page of an electronic book generated by a content generating device. In one aspect, the method, system, and apparatus is enabled through a Y-axis slide apart gesture that is applied to a notification region of the primary content page such that the secondary content data is made visible when the Y-axis slide apart gesture is applied to the notification region. The method, system, and apparatus is also enabled through a Y-axis pinch close gesture that is applied to a boundary of an exposed pane that is appearing in the primary content page such that the Y-axis pinch close gesture collapses the exposed pane in which the secondary content data is made visible.

In one aspect, a system includes an association server, an electronic book distribution server, a primary content database, a secondary content database and a content rendering device. In one aspect, the association server embeds a secondary content data from a secondary content database with a primary content page of an electronic book from a primary content database. This may be done to make operable a Y-axis slide apart gesture that is applied to a notification region of at least one of the primary content pages such that at least one of the secondary content data may be made visible when the Y-axis slide apart gesture is applied to the notification region. The electronic book distribution server may provide access to the electronic book having at least one secondary content data and at least one of the primary content pages. The content rendering device may generate at least one of the primary content pages embedded with at least one secondary content data when the electronic book is accessed through the electronic book distribution server.

In one aspect, the association server makes operable a Y-axis pinch close gesture that may be applied to a boundary of an exposed pane that is appearing in at least one of the primary content pages such that the Y-axis pinch close gesture collapses the exposed pane in which at least one of the secondary content data is made visible.

In another aspect, at least one of the primary content pages may be part of a literary work of authorship comprised primarily of literary content such that the literary work of authorship is comprised of primary content pages in which each subsequent primary content page further builds upon content described in at least some previous primary content page in a fashion such that an internal content of the literary work of authorship maintains a cohesive whole describing a theme of the literary work of authorship.

In yet another aspect, at least one of the secondary content data may be related to at least one of the primary content pages in a manner such that at least one of the secondary content data maintains a thematic relationship with at least one of the primary content pages it references.

Moreover, the secondary content data may be comprised of: a textual content related to at least one of the primary content pages, a multimedia content related to at least one of the primary content pages, a video content related to at least one of the primary content pages, a pictorial data related to at least one of the primary content pages, an explanatory data related to at least one of the plurality of primary content pages, a translation of at least one of the plurality of primary content pages, an advertisement related to at least one of the plurality of primary content pages, a summary data related to at least one of the plurality of primary content pages, and an interactive game related to at least one of the plurality of primary content pages.

The Y-axis slide apart gesture may be applied to the notification region of at least one of the plurality of primary content pages to separate a content adjacent to the notification region in a manner such that the content adjacent to the notification region separates synchronously with an open tactile motion of the Y-axis slide apart gesture and reveals the exposed pane through which at least one of the secondary content data is made visible.

The content rendering device may access at least one of the secondary content data from a remote source through a network, so as to enable at least one of the secondary content data to be refreshed in real-time based on a present state of the secondary content data.

The content rendering device may also access at least one of the secondary content data from a local storage on the content rendering device, so as to enable the content rendering device to be untethered from a network when accessing at least one of the secondary content data.

In another aspect, a method of an association server comprises: determining that at least one of a secondary content data may be associated with at least one of a primary content page based on the relevancy of at least one of the secondary content data with a semantic analysis of the literal expression on the primary content page. The method also comprises compiling a compiled content of an electronic book having at least one primary content page and at least one secondary content data. In addition, the method includes selecting a notification type from a notification library and placing the notification type in a notification region of the primary content page. Finally, the method includes embedding a Y-axis slide apart gesture module to the notification region of at least one of the primary content pages and embedding a Y-axis pinch close gesture module to at least one of the primary content pages.

In yet another aspect, the method of an association server makes operable a Y-axis slide apart gesture applied to the notification region of at least one of the primary content pages through an open function of the Y-axis slide apart gesture module such that at least one of the secondary content data is made visible in an exposed pane on the primary content page.

Additionally, the method of an association server makes operable a Y-axis pinch close gesture applied to a boundary of an exposed pane that may appear in at least one of the primary content pages through a close function of the Y-axis pinch close gesture module. By doing so, the Y-axis pinch close gesture collapses the exposed pane in which at least one of the secondary content data is made visible.

Finally, disclosed is an association server comprising: a compilation module, a notification placement module, and a gesture application module. The compilation module may create a compiled content of an electronic book comprising a plurality of primary content pages and a plurality of secondary content data where least one of the primary content pages is thematically associated with at least one of the secondary content data. The notification placement module may select a notification type from a notification library and may place the notification type in a notification region of at least one of the primary content pages.

Finally, a gesture application module may make visible at least one of the secondary content data in at least one of the primary content pages through a Y-axis slide apart module when a Y-axis slide apart gesture is applied to a notification region of at least one of the primary content pages. A Y-axis pinch close gesture restores at least one of the primary content pages to its original form through a Y-axis pinch close module when a Y-axis pinch close gesture is applied to an exposed pane containing at least one of the secondary content data associated with a primary content page of an electronic book generated by a content rendering device.

The methods disclosed herein may be implemented in any means for achieving various aspects, and may be executed in a form of a machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

Example embodiments are illustrated by way of example and are not limited to the figures of accompanying drawings, in which like references indicate similar elements and in which:

FIG. 8 is a table view of an electronic book having data association created through the association server of FIG. 1, according to an example embodiment.

Other features of the present embodiments will be apparent from accompanying drawings and from the detailed description that follows.

DETAILED DESCRIPTION

Example embodiments, as described below, may be used to provide several methods, a system, and an apparatus to create and expose secondary content data relevant to a primary content page of an electronic book. Although the present embodiments have been described with reference to specific example embodiments, it will be evident that various modifications and changes may be made to these embodiments without departing from the broader spirit and scope of the various embodiments.

Figure 1:
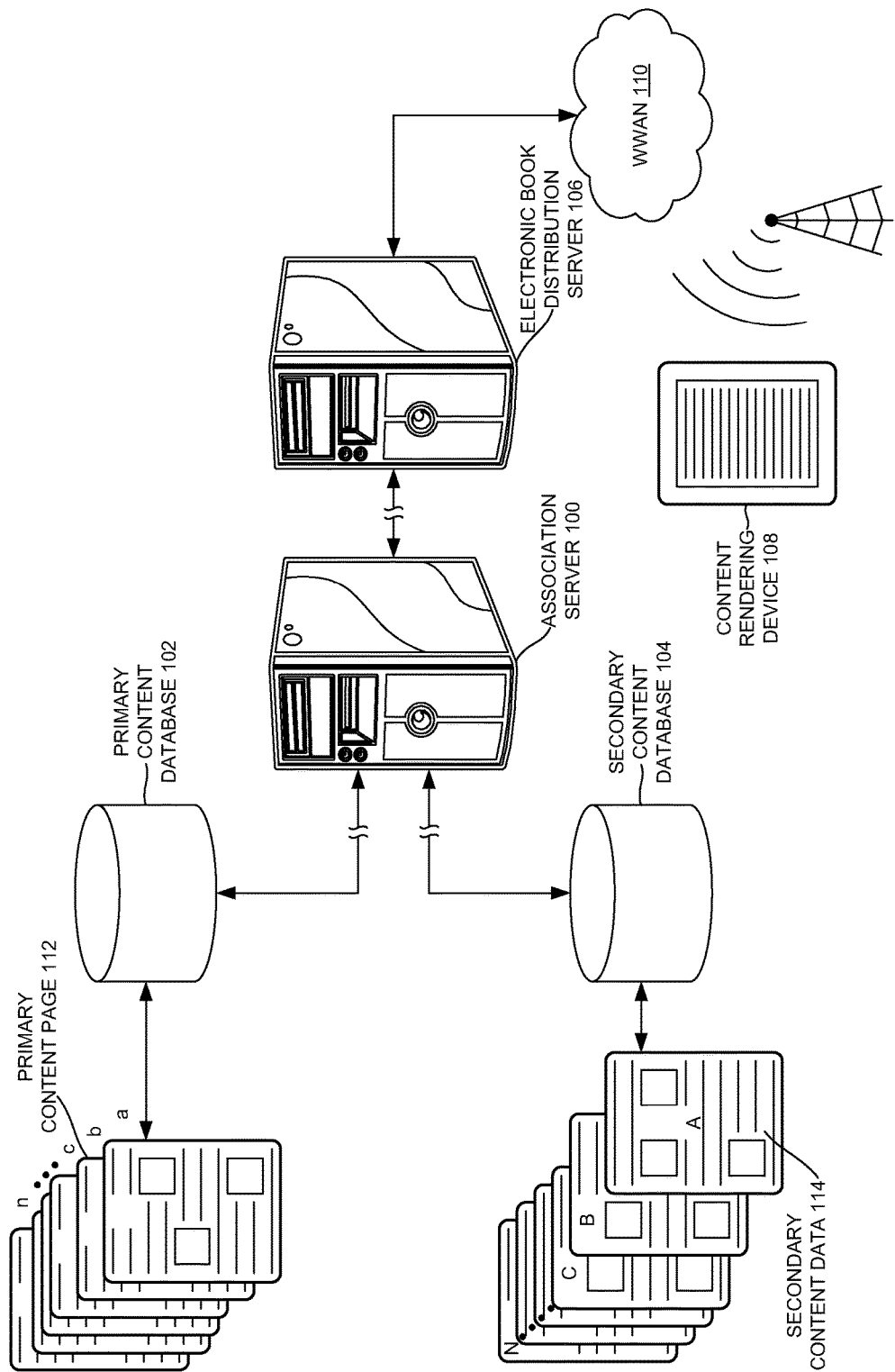
FIG. 1 illustrates a network architecture view of an association server involved in the creation of digital content, according to an example embodiment.

Reference is now made to FIG. 1, which illustrates an association server 100, a primary content database 102, a secondary content database 104, an electronic book distribution server 106, a content rendering device 108, a plurality of primary content pages 112, a plurality of secondary content data 114, and a wireless wide area network (WWAN) 110, according to one embodiment. In one embodiment, the association server 100 embeds at least one of the plurality of secondary content data 114 from the secondary content database 104 with at least one of the plurality of primary content pages 112 from the primary content database 102.

In one embodiment, at least one of the plurality of secondary content data 114 may be embedded with at least one of the plurality of primary content pages 112 by associating a file object of the secondary content data 114 with the primary content page 112 expressed as machine-readable code. Such machine-readable code may comprise code expressed as at least one of a markup language, a syndication language, a metadata language, a style sheet language, a client-side scripting language, a server-side scripting language, and a database language. In one embodiment, the embedded secondary content data 114 may be activated using a plug-in. The embedded secondary content data 114 may be activated using a function call, a call program, an executable script, and/or a self-executing program.

In another embodiment, at least one of the plurality of secondary content data 114 may be embedded with at least one of the plurality of primary content pages 112 through an embed tag. In yet another embodiment, at least one of the plurality of secondary content data 114 may be embedded with at least one of the plurality of primary content pages 112 by attaching a file of the secondary content data 114 to at least one of the plurality of primary content pages 112 through a file attachment annotation.

In one embodiment, at least one of the plurality of primary content pages 112 is a page of content from at least one of an electronic book, an electronic periodical, an electronic manuscript, an electronic recipe, an electronic manual, and an electronic work of authorship.

In one embodiment, the association server 100 makes operable a Y-axis slide apart gesture 200 (see FIG. 2A) that is applied to a notification region 202 (see FIG. 2A) of the primary content page 112 of an electronic book such that the secondary content data 114 is made visible when the Y-axis slide part gesture 200 is applied to the notification region 202.

In one embodiment, the association server 100 may comprise at least a processor, a memory, and a software program where the software program stored in the memory of the association sever 100 may be executed by the processor to make visible the secondary content data 114 when the Y-axis slide apart gesture is applied to the notification region 202 of the primary content page 112. In one embodiment, the program comprises an interface module allowing the user to interact with the content rendering device 108. The interface module may initiate a functional call to make visible the secondary content data 114 when the user applies the Y-axis slide apart gesture to a portion of display of the content rendering device 109 where the notification region 202 is located. In another embodiment, the Y-axis slide apart gesture 200 applied to the display of the content rendering device 108 may trigger a capacitive touch mechanism detected by the association server 100.

In one embodiment, the association server 100 references data comprising the primary content page 112 from the primary content database 102 through a wired and/or wireless network. The wired and/or wireless network may comprise at least one of a wireless communication network, an optical and/or infrared link, and a radio frequency link (e.g., Bluetooth®). The wireless communication network may be a local, proprietary network (e.g., an intranet) and/or may be a part of a larger wide-area network. The wireless communication network may also be a local area network (LAN), which may be communicatively coupled to a wide area network (WAN) such as the Internet.

In another embodiment, the association server 100 references database content from the secondary content database 104 through the previously described wired and/or wireless network (e.g., the Internet). The association server 100 may then transmit at least one of an associated electronic book, a compiled electronic book, and/or a compiled content 710 (see FIG. 7) to the electronic book distribution server 106 through a wired and/or wireless network (e.g., internet network).

The electronic book distribution server 106 may comprise at least a processor, a memory, and a software program where the software program is stored in the memory of the association sever 100 and may be executed by the processor having a set of instructions to perform a variety of functions on the set of data associated with the various embodiments. In one embodiment, the electronic book distribution server 106 provides access to the electronic book having at least one of the plurality of secondary content data 114 and at least one of the plurality of primary content pages 112. The electronic book distribution server 106 may include, but are not limited to: a Barnes & Noble electronic book distribution server, an Amazon® electronic book distribution server, a Google® distribution server, a Microsoft® distribution server, and/or an Apple® iTunes® distribution server. The electronic book distribution server 106 may, in turn, transmit at least one of an associated electronic book, a compiled electronic book, and/or the compiled content 710 (see FIG. 7) to an end user's content rendering device 108 through the WWAN 110.

The primary content database 102 may contain a plurality of primary content pages 112 comprised of literary works serving as baseline content, storied content, central content, and/or overarching content. The primary content database 102 may contain a collection of primary content pages 112 from one particular work of literary authorship or from any number of works of literary authorship. The secondary content database 104 may contain the plurality of secondary content data 114 comprised of text, images, video, and/or other dynamic content serving as supplemental, augmenting, and/or enhancing content. Such dynamic content may be presented using HTML5, CSS, FLASH, COLLADA 3D files, and/or files in the Unity programming language.

The plurality of secondary content data 114 may be distinguished from the plurality of primary content page 112 by its supplemental, augmenting, enhancing and/or commercial nature. For example, at least one primary content page 112 may be comprised of a story with a central theme that flows throughout the entire content, while at least one of the secondary content data 114 may only have relevance to one section of the primary content page 112. In addition, one piece of a plurality of secondary content data 114 within one literary work and/or electronic book may not have relevance and/or thematic connectivity to other pieces of a plurality secondary content data 114 in the same literary work and/or electronic book.

The secondary content database 104 can operate in any number of back-end database languages, including, but not limited to, SQL, MySQL, and/or any EPUB 3 standards. The association server 100 and the electronic book distribution server 106 can operate in any number of middleware languages, including, but not limited to, C#, PHP and/or Ruby. The content rendering device 108 can retrieve at least one of a plurality of secondary content data 114 from the secondary content database 104 through the process depicted in FIG. 1 upon a Y-axis slide apart gesture 200 (FIGS. 2A and 2B) by a user.

The content rendering device 108 may refer to at least one of: a thin client device, a tablet computer, a tablet reader, a smartphone, a personal digital assistant, a mobile phone, a Barnes & Noble Nook® reader, an Amazon® Kindle®, an Android® based phone and/or reader, a Microsoft 8® based phone and/or reader, a Sony® PRS®, a Kobo® electronic reader, and/or an Apple® iPhone® and/or iPad®. In one embodiment, the content rendering device 108 generates at least one of the plurality of primary content pages 112 embedded with at least one of the plurality of secondary content data 114 when the electronic book is accessed through the electronic book distribution server 106. In one embodiment, the content rendering device 108 may comprise a touch display and/or a touch screen. The touch display may comprise at least one of a multi-point touch input screen, a touch panel, and an LCD touch screen. In one embodiment, the multi-point touch input screen comprises a capacitive sensing medium configured to detect multiple touches (e.g., finger touches and/or finger gestures applied to a screen of the capacitive sensing medium) and/or near touches occurring at a distinct location in the plane of the touch panel and which produce a distinct signal representative of the touch at the distinct location of the multi-point touch input screen.

Figure 2:
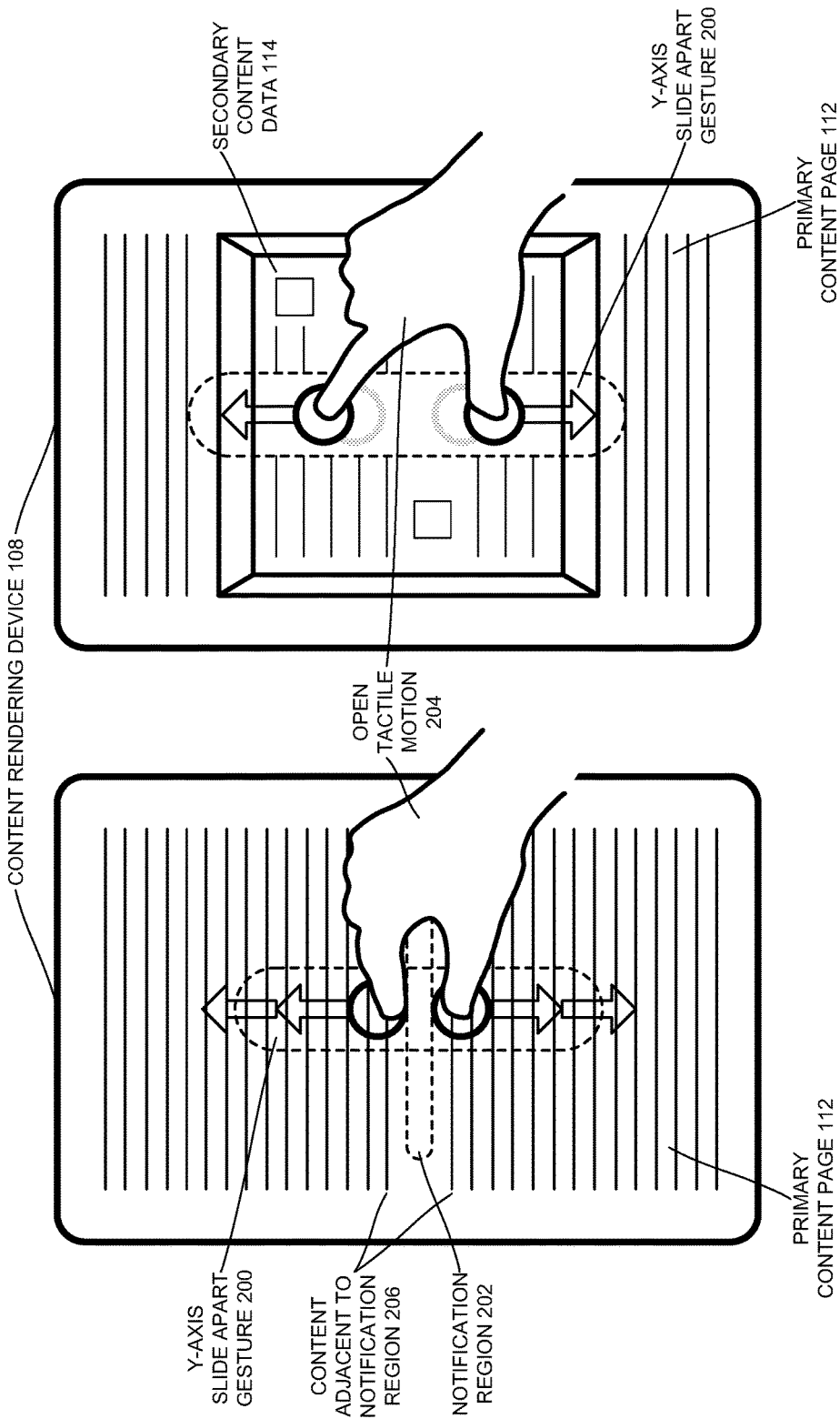
FIGS. 2A and 2B are interaction views, respectively, of a user exposing embedded secondary content data through a Y-axis gesture applied to a notification region of a primary content page made operable by the association server of FIG. 1, according to one embodiment.

Reference is now made to FIGS. 2A and 2B, which are interaction views, respectively, of a user exposing embedded secondary content data 114 through a Y-axis slide apart gesture 200 applied to a notification region 202 of the primary content page 112 made operable by the association server 100.

FIG. 2A illustrates a Y-axis slide apart gesture 200 applied to the notification region 202 of the primary content page 112 to separate a content adjacent to the notification region 206 in a manner such that the content adjacent to the notification region 206 separates synchronously with an open tactile motion 204 of the Y-axis slide apart gesture 200. In one embodiment, the open tactile motion 204 of the Y-axis slide apart gesture 200 reveals an exposed pane through which at least one of the secondary content data 114 is made visible. The open tactile motion 204 of the Y-axis slide apart gesture 200 may involve two or more fingers and may mimic, among other things, a vertical reverse pinch gesture of variable speed. In one embodiment, the Y-axis slide apart gesture 200 may reveal the secondary content data 114 in a manner similar to at least one of a window, a sliding door, a curtain slowly drawing open.

In another embodiment, the user may render Y-axis slide apart gesture 200 by quickly sliding two fingers in a quick vertical reverse pinch gesture and reveals the secondary content data 114 as a quickly expanding window. In yet another embodiment, the user may render a Y-axis slide apart gesture 200 using the tips of the user's index finger and thumb.

In yet another embodiment, the notification region 202 appears on the screen of the content rendering device 108 as at least one of a subtle horizontal line, a non-subtle horizontal line, a subtle dashed line, a non-subtle dashed line, a subtle image, a non-subtle image, a subtle object, and a non-subtle object. In any such case, the content notification region 202 may be interspersed among the various lines of ASCII and/or alphanumeric text on at least one primary content page 112 page and/or may appear above, below, and/or on the sides of the various lines of ASCI and/or alphanumeric text on at least one primary content page 112.

In one embodiment, the symbol and/or line used to evidence the content notification region 202 may be located in the proximal vicinity of at least one of the embedded secondary content data 114.

FIG. 2B illustrates the end result of the Y-axis slide apart gesture 200 being applied at the notification region 202 of the primary content page 112. As indicated in FIG. 2B, the end result of the Y-axis slide apart gesture 200 may be that the embedded secondary content data 114 has been revealed on the content rendering device 108 and may appear alongside remaining portions of the primary content page 112.

In another embodiment, the end result of a Y-axis slide apart gesture 200 may be that the newly exposed secondary content data 114 has shifted the pre-gesture positioning of at least one primary content page 112 to a new location on the screen of the content rendering device 108. In yet another embodiment, the end result of a Y-axis slide apart gesture 200 may be that the newly exposed secondary content 114 is overlaid on top of at least one primary content page 112 and does not shift the pre-gesture positioning of the primary content page 112 to a new location on the screen of the content rendering device 108.

In yet another embodiment, the association server 100 may make operable a Y-axis slide apart gesture 200 applied to the notification region 202 of the primary content page 112 through an open function of a Y-axis slide apart gesture module 716 (see FIG. 7) such that at least one of the secondary content data 114 is made visible in an exposed pane 304 (see FIG. 3A) on the primary content page 112

Figure 3:
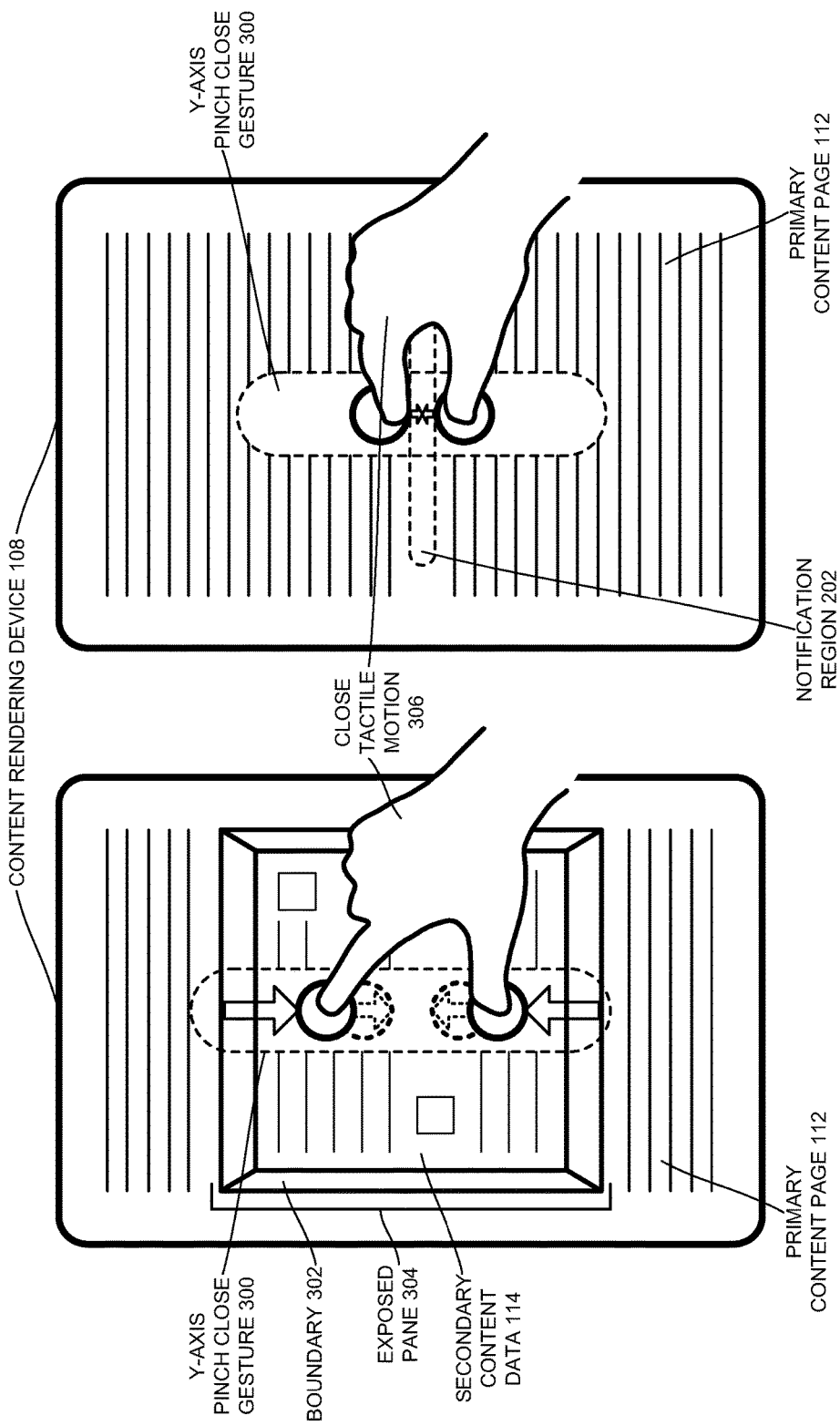
FIGS. 3A and 3B are interaction views, respectively, of a user hiding exposed embedded secondary content data through a Y-axis pinch close gesture applied to a boundary of an exposed pane in the primary content page made operable by the association server of FIG. 1, according to one embodiment

Reference is now made to FIGS. 3A and 3B, which are interaction views, respectively, of a user hiding at least one exposed embedded secondary content data 114 through a close tactile motion 306 of the Y-axis pinch close gesture 300 at a boundary 302 of an exposed pane 304 and restoring the primary content page 112, according to one embodiment. FIG. 3A illustrates a Y-axis pinch close gesture 300 being applied at a boundary 302 of an exposed pane 304 and restoring the primary content page 112. The close tactile motion 306 of the Y-axis pinch close gesture 300 may involve two or more fingers and may mimic, among other things, a vertical pinching gesture of variable speed.

In one embodiment, the user undertakes the close tactile motion 306 of the Y-axis pinch close gesture 300 using the tips of the user's index finger and thumb. In another embodiment, the user touches and/or nearly touches an X and/or a close box appearing on any of the corners of the exposed pane 304. In yet another embodiment, the user touches and/or nearly touches the side of the exposed pane 304. In yet a further embodiment, the user touches and/or nearly touches a region of the primary content page 112 still visible on the page of the content rendering device 109 to hide the exposed secondary content data 114 and restore the primary content page 112. In one more embodiment, the user touches the shifted and/or overlaid primary content page 112 to hide the exposed secondary content data 114 and restore the primary content page 112.

FIG. 3B illustrates the end result of the Y-axis pinch close gesture 300 being applied at the boundary 302 of the exposed pane 304. As indicated in FIG. 3B, the end result of the Y-axis pinch close gesture 300 may be that the exposed secondary content data 114 has been hidden from the user's view and no longer interferes with the user's literary experience. In one embodiment, the end result of the Y-axis pinch close gesture 300 is that the primary content page 112 has been restored to its unperturbed position on the screen of the content rendering device 108 and the secondary content data 114 has been hidden from view.

Figure 7:
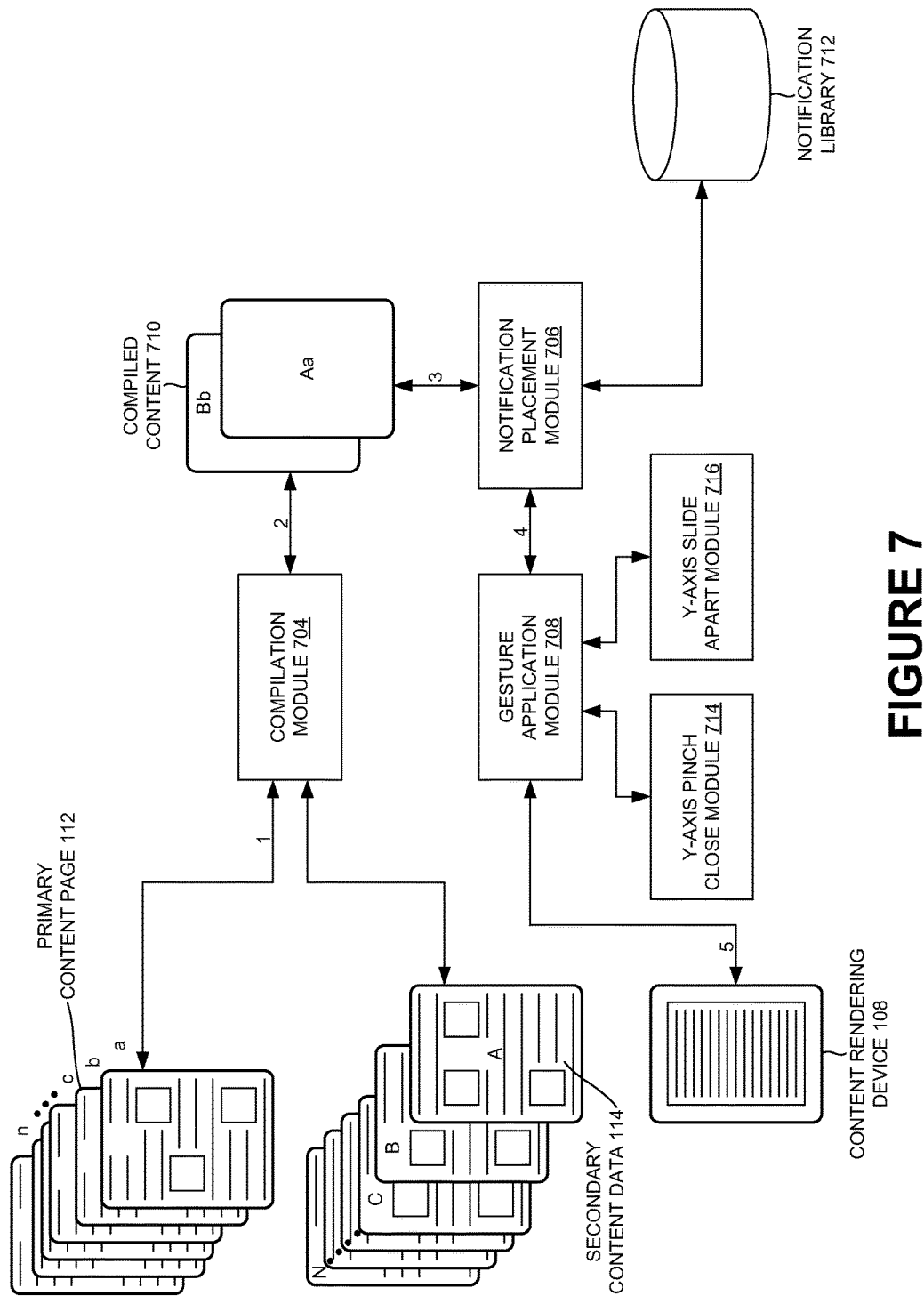
FIG. 7 illustrates an exploded view of the association server of FIG. 1, according to an example embodiment.

In one embodiment, the association server 100 makes operable the Y-axis pinch close gesture 300 applied to the boundary 302 of the exposed pane 304 through a close function of the Y-axis pinch close module 714 (see FIG. 7). The close function may restore the functionality of a notification placement module 706 (see FIG. 7) that permits the notification region 202 to appear on the primary content page 112 of the content rendering device 108.

Figure 4:
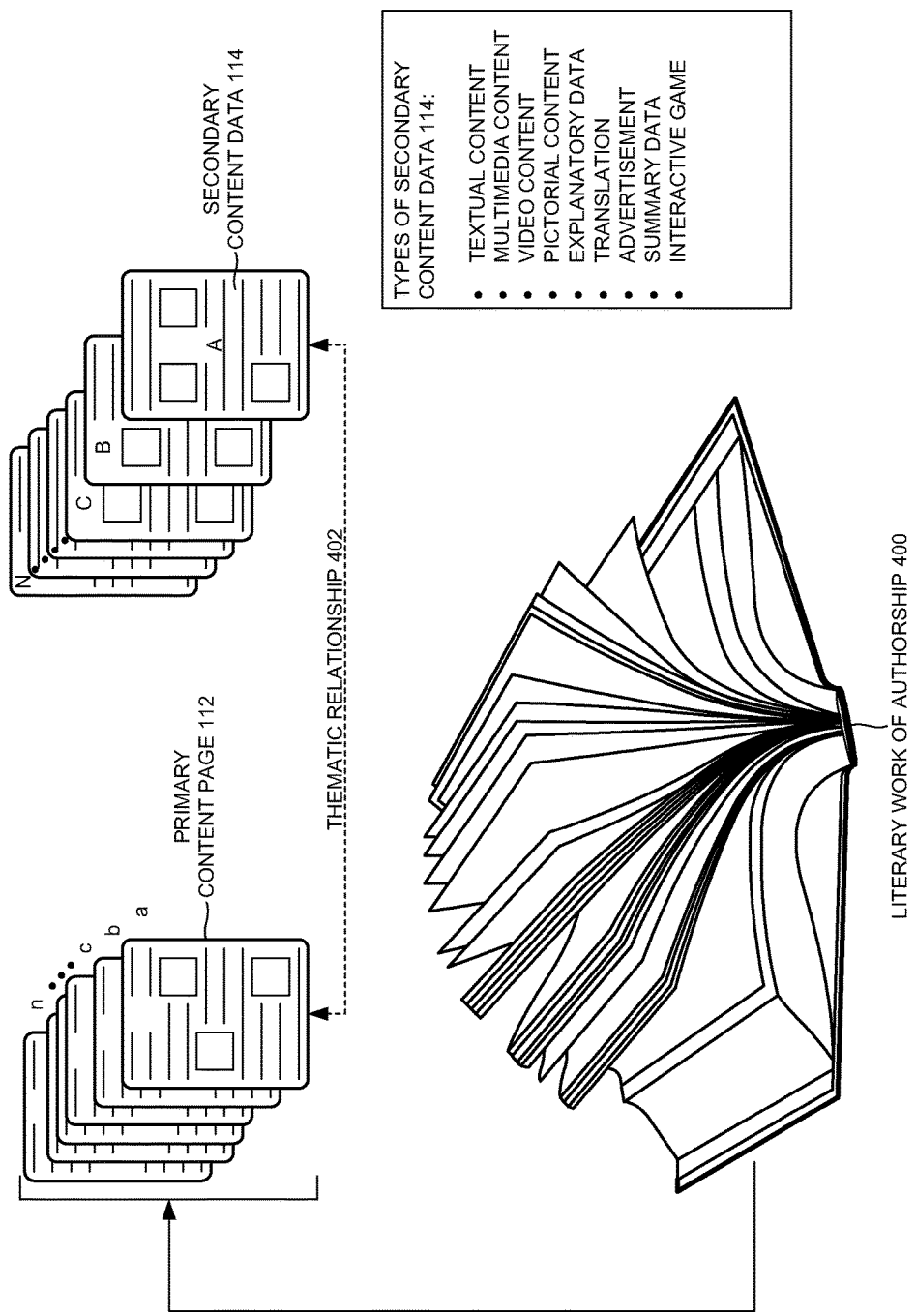
FIG. 4 illustrates a thematic relationship between the primary content page of Figure 1 and its associated secondary content data, according to an example embodiment.

Reference is now made to FIG. 4, which illustrates a plurality of primary content pages 112, a plurality of secondary content data 114, a literary work of authorship 400, and types of the secondary content data 114, in one embodiment. In one embodiment, at least one of the secondary content data 114 is related to at least one of the primary content pages 112 in a manner such that at least one of the secondary content data 114 maintains a thematic relationship 402 with at least one of the primary content pages 112 it references. In one embodiment, at least one of the primary content pages 112 is part of the literary work of authorship 400 comprised primarily of literary content. The plurality of primary content pages 112 of the literary work of authorship 400 may be organized such that each subsequent primary content page 112 further builds upon content described in at least some previous primary content page 112. In addition, an expressive content of the plurality of primary content pages 112 maintains a cohesive literary connection describing a theme of the literary work of authorship 400. In yet another embodiment, the secondary content data 114 may enhance the primary content page 112 by adding meaning and definition to the primary content page 112. In a further embodiment, the secondary content data 114 may further build upon the expressive content of the primary content page 112 by introducing a new content related to the primary content page 112.

The primary content page 112 may comprise a data file comprised of at least one of an ASCII text, an alphanumeric text, a multimedia content presented as a picture, a drawing, and/or an illustration in any number of formats including, but not limited to, JPEG, GIF, and/or PNG. The secondary content data 114 may be comprised of: a textual content related to at least one of the primary content pages 112, a multimedia content related to at least one of the primary content pages 112, a video content related to at least one of the primary content pages 112, a pictorial data related to at least one of the primary content pages 112, an explanatory data related to at least one of the plurality of primary content pages 112, a translation of at least one of the plurality of primary content pages 112, an advertisement related to at least one of the plurality of primary content pages 112, a summary data related to at least one of the plurality of primary content pages 112, and an interactive game related to at least one of the plurality of primary content pages 112.

The textual content may comprise a trivia content, a historical content, a background information content, and/or an auxiliary thematic content. All such content may be comprised of at least one of an ASCII text and/or an alphanumeric text. The multimedia content may be comprised of a picture file, a drawing file, an illustration file, and/or a sound file in any number of formats including, but not limited to, a Joint Photographic Experts Group (JPEG) format, a Graphics Interchange format (GIF), Tagged Image File format (TIFF), a Portable Network Graphics (PNG) format, a Musical Instrument Digital Interface (MIDI) format, a RealAudio® format, a waveform (way) format, a Windows® Media Audio format, and/or a dynamic content presented using a HyperText Markup Language (HTML), a Cascading Style Sheet (CSS), a Flash® format, and/or aCOLLAborative Design Activity (COLLADA) 3D file format. The video content may be comprised of a video file in any number of formats, including, but not limited to, an Audio Video Interleave (AVI) format, a Windows® Media Format (WMV), a Moving Pictures Expert Group (MPEG) format, a QuickTime® format, a RealVideo® format, and/or a Flash® format. The pictorial content may comprise a picture file, a drawing file, and/or an illustration file in any number of formats comprised of a Joint Photographic Experts Group (JPEG) format, a Graphics Interchange format (GIF), a Tagged Image File format (TIFF), and/or Portable Network Graphics (PNG) format.

The explanatory data may comprise an auxiliary thematic content, an explanatory thematic content, a definition, a synonym, and/or an antonym presented in at least one of the file formats described heretofore. The translation may include a translation of at least one of the primary content page 112 into at least one of a plurality of languages other than the original publication language of the primary content page 112. The advertisement may comprise an advertisement presented through an advertisement platform supported by at least one of a DoubleClick® platform, a 24/7 Media® platform, a MatchLogic® platform, and/or an Engage Technologies® platform. The summary data may be a file that summarizes any of the file content described heretofore. The interactive game may comprise at least one of a Flash® based game, an Alice® based game, a Java® based game, a Shockwave® based game, and/or a Unity® based game, in one embodiment.

Figure 5B:
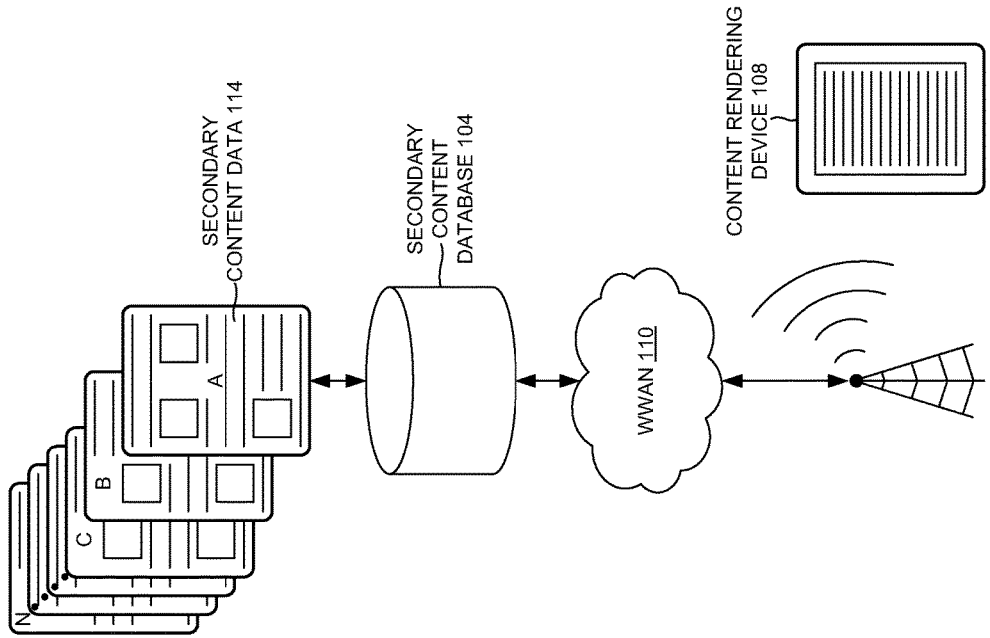
FIG. 5B illustrates the content rendering device of FIG. 1 accessing a wireless network to retrieve a secondary content data stored in a secondary content database, according to an example embodiment.
Figure 5A:
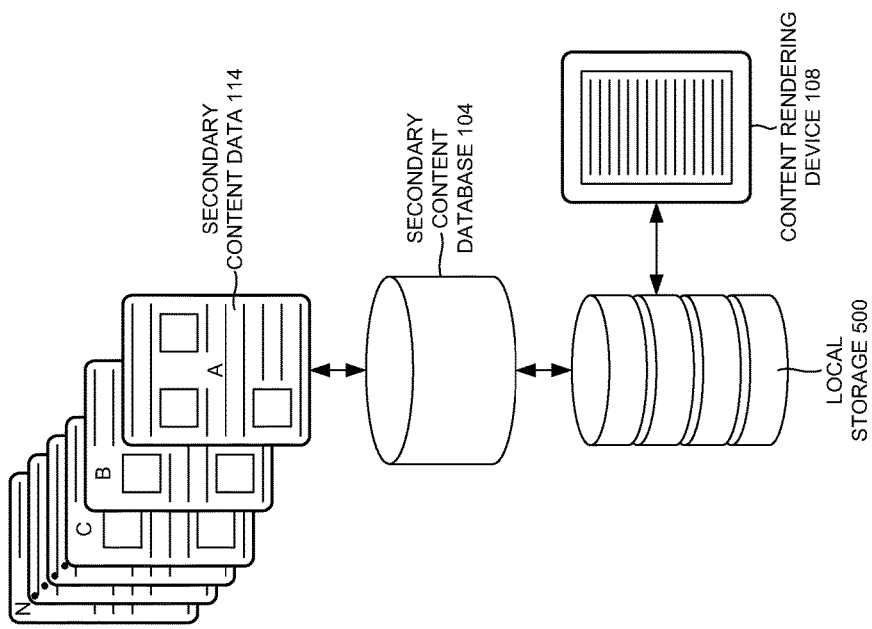
FIG. 5A illustrates the content rendering device of FIG. 1 accessing a local storage to retrieve a secondary content data stored in a secondary content database, according to an example embodiment.

Reference is now made to FIG. 5A which illustrates the content rendering device 108 of FIG. 1 accessing a local storage 500 to retrieve the secondary content data 114 stored in the secondary content database 104, according to an example embodiment. In one embodiment, the secondary content database 104 may be coupled with the local storage 500. In the embodiment, the local storage 500 may be a component of the content rendering device 108. In another embodiment, the content render device 108 may be coupled to the local storage 500 comprising the secondary content database 104. In one embodiment, the content rendering device 108 may send a query to the secondary content database 104 to retrieve the secondary content data 114.

In one embodiment, the local storage 500 enables the content rendering device 108 to be untethered from a network so a user can access the secondary data 114 without an active network connection.

Reference is now made to FIG. 5B, which illustrates the content rendering device 108 of FIG. 1 accessing the secondary content database 104 to retrieve the secondary content data 114 through the wireless wide area network (WWAN) 110, according to one embodiment. The secondary content data 114 may be stored in a repository of a cloud computing environment. In another embodiment, the secondary content database 104 may be located on a server untethered from the content rendering device 108. In the embodiment, the content rendering device 108 may access the secondary content database 104 through a wireless communication network. The wireless communication network may comprise signals transmitted over at least one of an infrared link, a radiofrequency link (e.g., Bluetooth®), and an optical link. The wireless communication network may be a local wireless network or part of a larger wide-area network.

Figure 6:
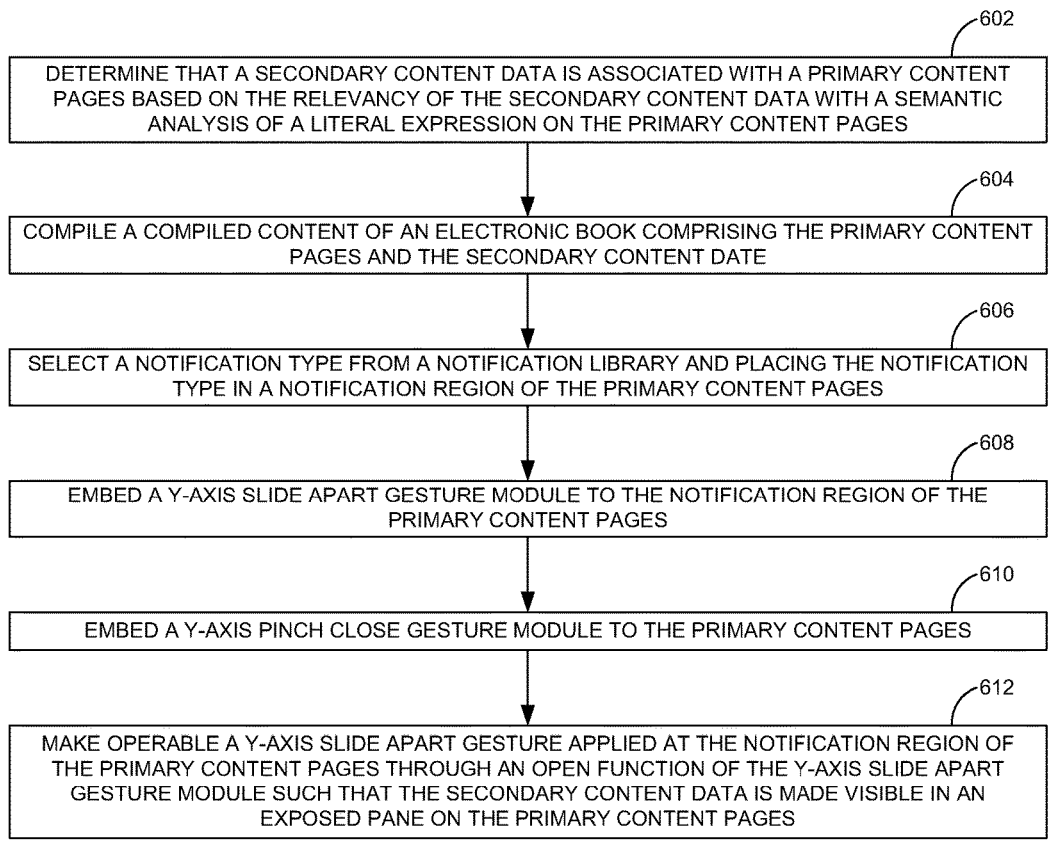
FIG. 6 is a flow chart illustrating the method of compiling an electronic book using the association server of FIG. 1, according to an example embodiment.

Reference is now made to FIG. 6 which illustrates the operations involved in a method of compiling an electronic book comprising of the secondary content data 114 and the primary content page 112 using the association server 100, according to one embodiment.

In one or more embodiments, operation 602 may involve the association server 100 determining that at least one of the plurality of secondary content data 114 is associated with at least one of the plurality of primary content pages 112 based on a relevancy of at least one of the plurality of secondary content data 114 with a semantic analysis of a literal expression on at least one of the plurality of primary content pages 112. In one or more embodiments, operation 604 may involve the association server 100 compiling a compiled content 710 (see FIG. 7) of an electronic book comprising at least one of the plurality of primary content pages 112 and at least one of the plurality of secondary content data 114.

In one or more embodiments, operation 606 may involve the association server 100 selecting a notification type from a notification library 712 (see FIG. 7) and placing the notification type in the notification region 202 of at least one of the plurality of primary content pages 112, wherein the literal expression in the notification region 202 has relevancy to at least one of the plurality of secondary content data 114. Operation 608 may involve the association server 100 embedding a Y-axis slide apart gesture module 716 (see FIG. 7) to the notification region 202 of at least one of the plurality of primary content pages 112. Operation 610 may involve the association server 100 embedding a Y-axis pinch close gesture module 714 (see FIG. 7) to at least one of the primary content pages 112. Operation 612 may involve the association server 100 making operable a Y-axis slide apart gesture 200 applied to the notification region 202 of at least one of the plurality of primary content pages 112 through an open function of the Y-axis slide apart gesture module 716 such that at least one of the plurality of the secondary content data 114 is made visible in the exposed pane 304 on at least one of the plurality of primary content pages 112.

Reference is now made to FIG. 7, which illustrates an exploded view of the association server 100 of FIG. 1, according to one embodiment. FIG. 7 depicts a plurality of primary content pages 112, a plurality of secondary content data 114, a compilation module 704, a notification placement module 706, a gesture application module 708, a plurality of compiled content 710, a notification library 712, a Y-axis pinch close module 714, a Y-axis slide apart module 716, and a content rendering device 108.

The compilation module 704 may create a compiled content 710 of an electronic book comprising a plurality of primary content pages 112 and a plurality of secondary content data 114, wherein least one of the primary content pages 112 is thematically associated with at least one of the secondary content data 114. In one embodiment, the compilation module 704 may reference the primary content database 102 to select at least one of the primary content pages 112 stored in the primary content database 102. The compilation module 704 may reference the primary content database 102 by sending a query to the primary content database 102.

In one embodiment, the primary content database 102 may be stored in a volatile memory of a server. In another embodiment, the primary content database 102 may be stored in a non-volatile memory of a server. These servers may be coupled to the association server 100. In another embodiment, the primary content database 102 may be stored in at least one of a non-volatile memory and a volatile memory of the association server 100. In the embodiment, the compilation module 704 may also be stored in at least one of a volatile memory and a non-volatile memory of the association server 100.

In one or more embodiments, the compilation module 704 may reference the primary content database 102 to select at least one of the secondary content data 114 stored in the secondary content database 104. The compilation module 704 may reference the secondary content database 104 by sending a query to the secondary content database 104. In one embodiment, the secondary content database 104 may be stored in a volatile memory of a server. In another embodiment, the secondary content database 104 may be stored in a non-volatile memory of a server. These servers may be coupled to the association server 100. In another embodiment, the secondary content database 104 may be stored in at least one of a non-volatile memory and a volatile memory of the association server 100. In the embodiment, the compilation module 704 may also be stored in at least one of a volatile memory and a non-volatile memory of the association server 100. The compilation module 704 may be written in any number of middleware languages including, but not limited to, C#, PHP, and/or Ruby.

In one or more embodiments, the compilation module 704 creates the compiled content 710. In one example embodiment depicted in FIG. 7, the compilation module 704 embeds a secondary content data 114A with a primary content page 112a and creates a compiled content 710Aa. In another example embodiment depicted in FIG. 7, the compilation module 704 embeds a secondary content data 114B with a primary content page 112b and creates a compiled content 710Bb.

In one or more embodiments, the notification placement module 706 retrieves a notification type from the notification library 712 and embeds the notification type with the compiled content 710. The notification placement module 706 may embed the notification type by indicating a page location where the notification type should appear on the primary content page 112. The notification placement module 706 may also indicate the page location where the notification region 200 of FIG. 2A should appear.

In one or more embodiments, the notification placement module 706 may reference the notification type by sending a query to the notification library 712. In one or more embodiments, the notification library 712 is a database. In the embodiment, the notification library 712 may be stored in a volatile memory of a server. In another embodiment, the notification library 712 may be stored in a non-volatile memory of a server. These servers may be coupled to the association server 100. In another embodiment, the notification library 712 may be stored in at least one of a non-volatile memory and a volatile memory of the association server 100. In the embodiment, the notification placement module 706 may also be stored in at least one of a volatile memory and a non-volatile memory of the association server 100. The notification placement module 706 may be written in any number of middleware languages including, but not limited to, C#, PHP, and/or Ruby. The notification library 712 may be updated upon a request by the user and/or remotely through a wide-area network.

In one or more embodiments, a gesture application module 708 makes visible at least one of the secondary content data 114 in at least one of the primary content pages 112 through a Y-axis slide apart module 716. In one embodiment, the Y-axis slide apart module 716 makes operable a Y-axis slide apart gesture 200 applied to the notification region 202 of at least one of the primary content pages 112. The gesture application module 708 also makes operable a Y-axis pinch close gesture 300 by restoring at least one of the primary content pages 112 to its original form when a Y-axis pinch close gesture 300 is applied to the boundary 302 of the exposed pane 304 indicated in FIG. 3A.

The notification placement module 706 may work alongside the gesture application module 708 to expose the secondary content data 114 to a user of the content rendering device 108. The gesture application module 708 may be triggered by at least one of the Y-axis pinch close module 714 and the Y-axis slide apart module 716. At least one of the gesture application module 708, the Y-axis pinch close module 714, and the Y-axis slide apart module 716 may be stored in a volatile memory of a server. In another embodiment, at least one of the gesture application module 708, the Y-axis pinch close module 714, and the Y-axis slide apart module 716 may be stored in a non-volatile memory of a server. These servers may be coupled to the association server 100. The gesture application module 708, the Y-axis pinch close module 714, and/or the Y-axis slide apart module 716 may be written in any number of middleware languages including, but not limited to, C#, PHP, and/or Ruby.

Reference is now made to FIG. 8, which is a table view of an electronic book having data association created through the association server 100 of FIG. 1, according to one or more embodiments. In one or more embodiments, the association server 100 associates a page location 808 of an electronic book with a particular page of the plurality of primary content pages 112. In addition, both the page location 808 and the primary content page 112 may be associated with a specific data file of the plurality of secondary content data 114. Moreover, the primary content page 112 and the secondary content data 114 form the compiled content 710. In one embodiment, the association server associates a notification type 802, a notification location 804, and a secondary fetch location 806 with the compiled content 710.

For example, as depicted in FIG. 8, the association server 100 may associate page location 1 of the electronic book with a primary content page 112a, and also associate a secondary content data 114A with the primary content page 112a. A compiled content 710Aa, resulting from the page association, may be associated with a notification type 802A (e.g., a "standard" notification type) at a location ¾ of the total distance down from the top of the primary content page 112a. In this example embodiment, the association server 100 may fetch the secondary content data 114 from a client device.

In another embodiment, page location 15 of the electronic book may be associated with a primary content page 112b, which may, in turn, be associated with a secondary content data 114B. A compiled content 710Bb resulting from the page association, may be associated with a notification type 802B (e.g., a "custom" notification type) at a location ⅔ of the total distance down from the top of primary content page 112b. In this example, the association server 100 may fetch the secondary content data 114 from a server through a network.

In yet another embodiment, page location 24 of the electronic book may be associated with a primary content page 112c, which may, in turn, be associated with a secondary content data 114C. A compiled content 710Cc resulting from the page association, may be associated with a notification type 802C (e.g., an "image" notification type) at a location ⅞ of the total distance down from the top of primary content page 112c. In this example, the association server 100 may fetch the secondary content data 114 from both a client device and a server through a network.

Figure 9:
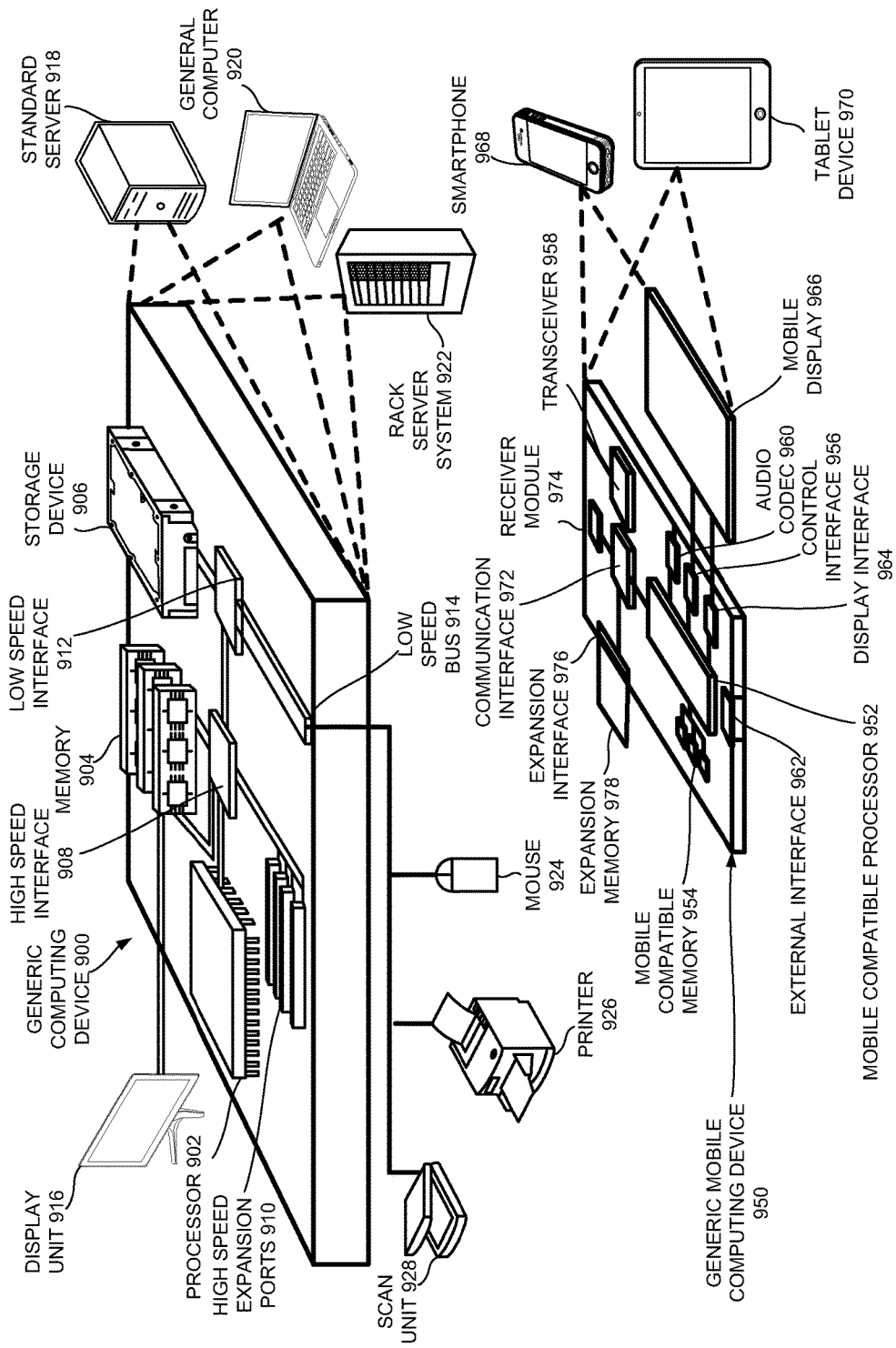
FIG. 9 is a schematic of a generic computing device and a generic mobile computing device that can be used to perform and/or implement any of the embodiments disclosed herein.

FIG. 9 is a schematic of a generic computing device 900 and a generic mobile computing device 950 that can be used to perform and/or implement any of the embodiments disclosed herein. The generic computing device 900 may represent various forms of digital computers, such as laptops, desktops, workstations, personal digital assistants, servers, blade servers, mainframes, and/or other appropriate computers. The generic mobile computing device 950 may represent various forms of mobile devices, such as smartphones, personal digital assistants, cellular telephones, and other similar generic mobile computing devices. The components shown here, their connections, couples, and relationships, and their functions, are meant to be exemplary only, and are not meant to limit the embodiments described and/or claimed.

The generic computing device 900 may include a processor 902, a memory 904, a storage device 906, a high speed interface 908 coupled to the memory 904 and a plurality of high speed expansion ports 910, and a low speed interface 912 coupled to a low speed bus 914 and a storage device 906. In one embodiment, each of the components heretofore may be inter-coupled using various buses, and may be mounted on a common motherboard and/or in other manners as appropriate. The processor 902 may process instructions for execution in the generic computing device 900, including instructions stored in the memory 904 and/or on the storage device 906 to display a graphical information for a GUI on an external input/output device, such as a display unit 916 coupled to the high speed interface 908. In other embodiments, multiple processors and/or multiple buses may be used, as appropriate, along with multiple memories and/or types of memory. Also, a plurality of generic computing devices 900 may be coupled with, with each device providing portions of the necessary operations (e.g., as a server bank, a group of blade servers, and/or a multi-processor system).

The memory 904 may be coupled to the generic computing device 900. In one embodiment, the memory 904 may be a volatile memory. In another embodiment, the memory 904 may be a non-volatile memory. The memory 904 may also be another form of computer-readable medium, such as a magnetic and/or an optical disk. The storage device 906 may be capable of providing mass storage for the generic computing device 900. In one embodiment, the storage device 906 may be comprised of at least one of a floppy disk device, a hard disk device, an optical disk device, a tape device, a flash memory and/or other similar solid state memory device. In another embodiment, the storage device 906 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 904, the storage device 906, a memory coupled to the processor 902, and/or a propagated signal.

The high speed interface 908 may manage bandwidth-intensive operations for the generic computing device 900, while the low speed interface 912 may manage lower bandwidth-intensive operations. Such allocation of functions is exemplary only. In one embodiment, the high-speed interface 908 may be coupled to at least one of the memory 904, the display unit 916 (e.g., through a graphics processor and/or an accelerator), and to the plurality of high speed expansion ports 910, which may accept various expansion cards. In the embodiment, the low speed interface 912 may be coupled to at least one of the storage device 906 and the low-speed bus 914. The low speed bus 914 may be comprised of a wired and/or wireless communication port (e.g., a Universal Serial Bus ("USB"), a Bluetooth® port, an Ethernet port, and/or a wireless Ethernet port). The low speed bus 914 may also be coupled to at least one of scan unit 928, a printer 926, a keyboard, a mouse 924, and a networking device (e.g., a switch and/or a router) through a network adapter.

The generic computing device 900 may be implemented in a number of different forms, as shown in the figure. In one embodiment, the generic computing device 900 may be implemented as a standard server 920 and/or a group of such servers. In another embodiment, the generic computing device 900 may be implemented as part of a rack server system 922. In yet another embodiment, the generic computing device 900 may be implemented as a general computer 920 such as a laptop computer. Alternatively, a component from the generic computing device 900 may be combined with another component in a generic mobile computing device 950. In one or more embodiments, an entire system may be made up of a plurality of generic computing devices 900 and/or a plurality of generic computing devices 900 coupled to a plurality of generic mobile computing devices 950.

In one embodiment, the generic mobile computing device 950 may comprise at least one of a mobile compatible processor 952, a mobile compatible memory 954, and an input/output device such as a mobile display 966, a communication interface 972, and a transceiver 958, among other components. The generic mobile computing device 950 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 952 may execute instructions in the generic mobile computing device 950, including instructions stored in the mobile compatible memory 954. The mobile compatible processor 952 may be implemented as a chipset of chips that include separate and multiple analog and digital processors. The mobile compatible processor 952 may provide, for example, for coordination of the other components of the generic mobile computing device 950, such as control of user interfaces, applications run by the generic mobile computing device 950, and wireless communication by the generic mobile computing device 950.

The mobile compatible processor 952 may communicate with a user through the control interface 956 and the display interface 964 coupled to a mobile display 966. In one embodiment, the mobile display 966 may be at least one of a Thin-Film-Transistor Liquid Crystal Display ("TFT LCD"), an Organic Light Emitting Diode ("OLED") display, and another appropriate display technology. The display interface 964 may comprise appropriate circuitry for driving the mobile display 966 to present graphical and other information to a user. The control interface 956 may receive commands from a user and convert them for submission to the mobile compatible processor 952. In addition, an external interface 962 may be provide in communication with the mobile compatible processor 952, so as to enable near area communication of the generic mobile computing device 950 with other devices. External interface 962 may provide, for example, for wired communication in some embodiments, or for wireless communication in other embodiments, and multiple interfaces may also be used.

The mobile compatible memory 954 may be coupled to the generic mobile computing device 950. The mobile compatible memory 954 may be implemented as at least one of a volatile memory and a non-volatile memory. The expansion memory 978 may also be coupled to the generic mobile computing device 950 through the expansion interface 976, which may comprise, for example, a Single In Line Memory Module ("SIMM") card interface. The expansion memory 978 may provide extra storage space for the generic mobile computing device 950, or may also store an application or other information for the generic mobile computing device 950. Specifically, the expansion memory 978 may comprise instructions to carry out the processes described above. The expansion memory 978 may also comprise secure information. For example, the expansion memory 978 may be provided as a security module for the generic mobile computing device 950, and may be programmed with instructions that permit secure use of the generic mobile computing device 950. In addition, a secure application may be provided on the SIMM card, along with additional information, such as placing identifying information on the SIMM card in a non-hackable manner.

The mobile compatible memory 952 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 954, the expansion memory 978, a memory coupled to the mobile compatible processor 952, and a propagated signal that may be received, for example, over the transceiver 958 and/or the external interface 962.

The generic mobile computing device 950 may communicate wirelessly through the communication interface 972, which may be comprised of a digital signal processing circuitry. The communication interface 972 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver 958. In addition, short-range communication may occur, such as using a Bluetooth®, Wi-Fi, and/or other such transceiver. In addition, a GPS ("Global Positioning System") receiver module may provide additional navigation-related and location-related wireless data to the generic mobile computing device 950, which may be used as appropriate by a software application running on the generic mobile computing device 950.

The generic mobile computing device 950 may also communicate audibly using an audio codec 960, which may receive spoken information from a user and convert it to usable digital information. The audio codec 960 may likewise generate audible sound for a user, such as through a speaker (e.g., in a handset of the generic mobile computing device 950). Such a sound may comprise a sound from a voice telephone call, a recorded sound (e.g., a voice message, a music files, etc.) and may also include a sound generated by an application operating on the generic mobile computing device 950.

The generic mobile computing device 950 may be implemented in a number of different forms, as shown in the figure. In one embodiment, the generic mobile computing device 950 may be implemented as a smartphone 968. In another embodiment, the generic mobile computing device 950 may be implemented as a personal digital assistant ("PDA"). In yet another embodiment, the generic mobile computing device, 950 may be implemented as a tablet device 982.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse 924 by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

An example will now be described in which the various embodiments will be explained in a hypothetical scenario. A reader may be reading Geoffrey Chaucer's The Canterbury Tales on a content rendering device 108 (e.g., a Barnes & Noble Nook® device). The reader may be reading a passage regarding the shrine of Saint Thomas Becket at Canterbury Cathedral and wondering if Canterbury Cathedral actually exists. The reader may see a notification icon next to the line of text mentioning Canterbury Cathedral. The reader, wanting to know more about Canterbury Cathedral, applies a Y-axis slide apart gesture 200 to the screen of the content rendering device 108 through an open tactile motion 204 using the tips of the reader's thumb and index finger. The content adjacent to the notification region 206 shifts as the exposed pane 304 appears on the screen of the content rendering device 108.

The user reads the secondary content data 114 (which, in this case, is a text passage on Canterbury Cathedral) appearing in the exposed pane 304 and learns that Canterbury Cathedral is located in Canterbury, Kent in England. The reader also learns that the cathedral was completed in the $11^{th}$ century and was the site of Archbishop Thomas Becket's murder. After reading this, the user hides the exposed pane 304 by applying a Y-axis pinch close gesture 300 to the boundary 302 of the exposed pane 304 through a close tactile motion 306 using the same two fingers. Once the exposed pane 304 has been closed, the user continues reading The Canterbury Tales on the content rendering device 108 and eagerly reads on having obtained important context pertaining to a crucial element of the story.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the Figures. Accordingly, the specification and/or drawings may be regarded in an illustrative rather than a restrictive sense.

What is claimed is:

1. A device comprising:
   a touch-sensitive display for displaying a primary content page and allowing user input, the primary content page being a page of content from a digital document; and
   a user interface including a secondary content display mode configured to activate in response to a Y-axis slide apart gesture that is applied to a notification region of the primary content page thereby causing secondary content to be displayed, wherein the notification region is adjacent to first and second portions of content displayed in the primary content page and is configured to expand during the Y-axis slide apart gesture to separate the first and second portions of content adjacent to the notification region to reveal at least a portion of the secondary content therein.

2. The device of claim 1, wherein the Y-axis slide apart gesture that is applied to the notification reveals an exposed pane between the first and second portions of content through which the secondary content is made visible.

3. The device of claim 1, wherein a Y-axis pinch close gesture applied to the notification region restores the primary content page to its original form by collapsing the notification region and hiding the secondary content from view.

4. The device of claim 1, wherein the secondary content is revealed at a variable speed as determined by the speed at which the Y-axis slide apart gesture is applied.

5. The device of claim 1, wherein the notification region is displayed on the touch-sensitive display as a line or image.

6. The device of claim 1, wherein the first and second portions of content in the primary content page comprise is at least one of ASCII text, alphanumeric text and an image.

7. The device of claim 1, wherein the secondary content is thematically associated with content displayed on the primary content page.

8. The device of claim 7, wherein the secondary content includes at least some content of a different type than the content displayed in the primary content page.

9. The device of claim 8, wherein the secondary content includes explanatory data about content in the primary content page, wherein the explanatory data includes at least one of a definition, a translation, a synonym and an antonym.

10. The device of claim 8, wherein the secondary content includes textual content in addition to at least one of a trivia content, historical content, and background information content.

11. The device of claim 1, further comprising a network interface device configured to communicatively couple with a network, and receive the at least a portion of secondary content from a secondary content server via the network.

12. A method comprising:
displaying a primary content page via a touch-sensitive display, the primary content page being a page of content from a digital document;
receiving, via the touch-sensitive display, a Y-axis slide apart gesture that is applied to a notification region of the primary content page; and
displaying secondary content via the touch-sensitive display in response to receiving the Y-axis slide apart gesture, wherein the notification region is adjacent to first and second portions of content displayed in the primary content page and is configured to expand in response to the Y-axis slide apart gesture to separate the first and second portions of content adjacent to the notification region to reveal at least a portion of the secondary content therein.

13. The method of claim 12, wherein the Y-axis slide apart gesture that is applied to the notification region separates content adjacent to the notification region in a manner such that the first and second portions of content adjacent to the notification region separate synchronously with an open tactile motion of the Y-axis slide apart gesture and reveals an exposed pane between the separated content through which the secondary content is made visible.

14. The method of claim 12, further comprising collapsing, in response to receiving a Y-axis pinch close gesture, the notification region thereby restoring the primary content page to its original form such that the secondary content is hidden from view.

15. The method of claim 12, wherein the secondary content is revealed at a variable speed as determined by the speed at which the Y-axis slide apart gesture is applied.

16. The method of claim 12, further comprising receiving the at least a portion of secondary content from a secondary content server via a communication network.

17. The method of claim 12, further comprising receiving the at least a portion of secondary content from a memory of an electronic device configured with the touch-sensitive display.

18. A non-transitory computer readable medium encoded with instructions that when executed by one or more processors cause a secondary content display process to be carried out, the process comprising:
display a primary content page via a touch-sensitive display, the primary content page being a page of content from a digital document;
receive, via the touch-sensitive display, a Y-axis slide apart gesture that is applied to a notification region of the primary content page; and
display secondary content via the touch-sensitive display in response to receiving the Y-axis slide apart gesture, wherein the notification region is adjacent to first and second portions of content displayed in the primary content page and is configured to expand in response to the Y-axis slide apart gesture to separate the first and second portions of content adjacent to the notification region to reveal at least a portion of the secondary content therein.

19. The non-transitory computer readable medium of claim 18, wherein the Y-axis slide apart gesture that is applied to the notification region reveals an exposed pane between the first and second portions of content through which the secondary content is made visible.

20. The non-transitory computer readable medium of claim 18, the process being further configured to receive the at least a portion of secondary content from a secondary content server via a communication network.

21. The device of claim 1, wherein the digital document is one of an electronic book, an electronic periodical, an electronic manuscript, an electronic recipe, an electronic manual, and an electronic work of authorship.

* * * * *